Jan. 6, 1959 W. R. JOY 2,867,137
CUTTING TOOLS AND METHOD OF MAKING SAME
Filed Nov. 9, 1954 2 Sheets-Sheet 1
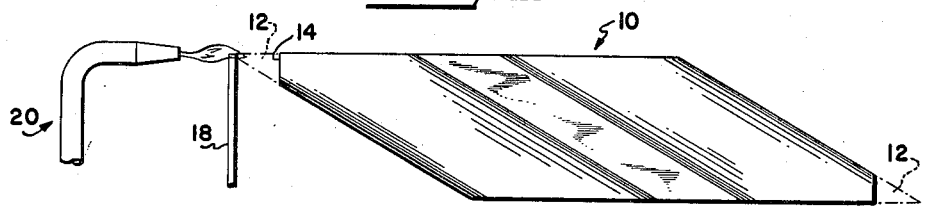
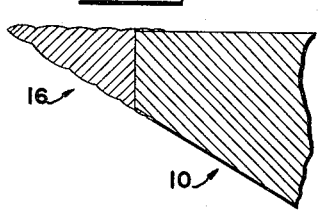 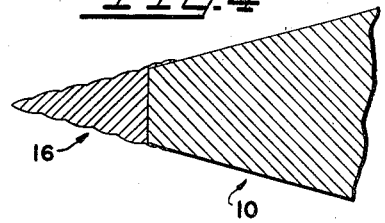
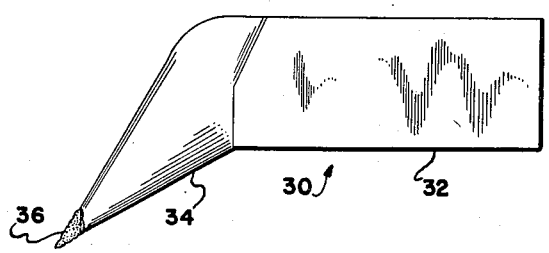
INVENTOR
WILBUR R. JOY
BY Church & Church
ATTORNEY Jan. 6, 1959 — W. R. JOY — 2,867,137
CUTTING TOOLS AND METHOD OF MAKING SAME
Filed Nov. 9, 1954 — 2 Sheets-Sheet 2
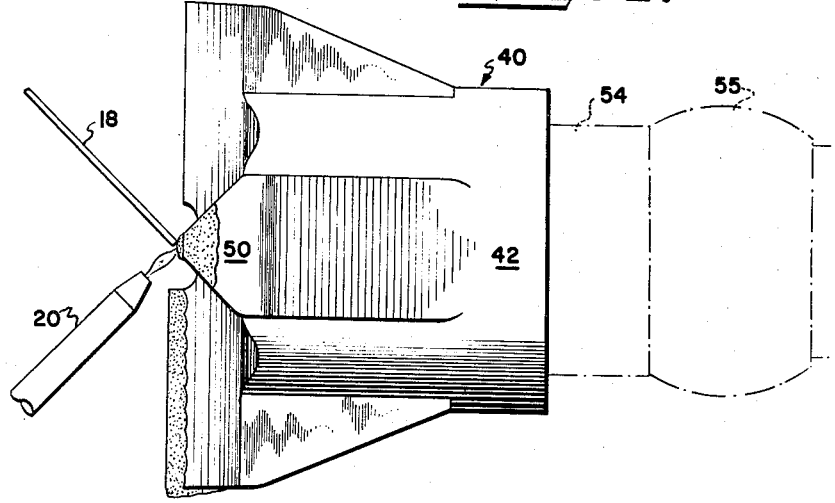
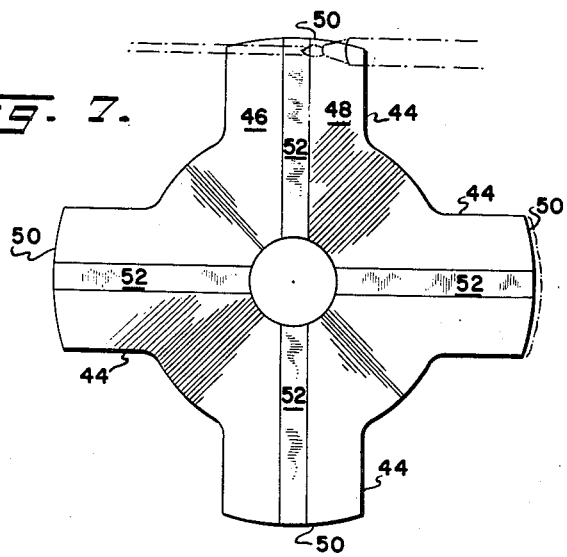
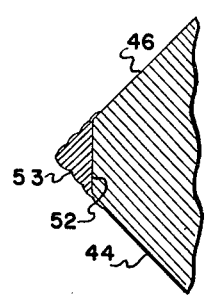
INVENTOR
WILBUR R. JOY
BY Church & Church
ATTORNEY

United States Patent Office 2,867,137
Patented Jan. 6, 1959

2,867,137

CUTTING TOOLS AND METHOD OF MAKING SAME

Wilbur R. Joy, Prestonsburg, Ky.

Application November 9, 1954, Serial No. 467,776

4 Claims. (Cl. 76—101)

This invention relates to cutting tools and a method of making cutting tools, and more particularly to cutting bits and a method of making the same in which the cutting bit is provided with a cutting edge or tip of hard metal alloy, such as tungsten carbide.

The wear-resisting properties of the hard metal alloys such as tungsten carbide, for example, have caused the wide-spread use of such alloys in many different types of cutting tools. These hard metal alloys are most frequently used as inserts in the cutting or wear surfaces of the tool with which they are used. When the tungsten carbide is used in insert form, the tool must be suitably grooved or recessed in order to receive the insert, and the insert is then subsequently cemented or otherwise suitably joined to the body of the tool. It can readily be appreciated that the use of tungsten carbide inserts is expensive due principally to the machining of the tool which is required in order to receive the insert. It is also known in the manufacture of cutting tools to coat the outer surface of a softer metal with a coating of a wear-resistant hard metal alloy such as tungsten carbide.

Cutting tools or bits having cutting or wear surfaces of hard metal alloys, whether in the form of inserts or coatings, are generally quite expensive. In the operation of certain types of cutting machines such as coal-cutting machines, for example, which require a large number of bits for their operation, the cost of the bits having cutting surfaces of hard metal alloy can become a considerable cost factor since frequent replacement of bits is necessary, even when bits having wearing surfaces of tungsten carbide or other hard metal alloys are used.

Accordingly, it is an object of this invention to provide a cutting tool, particularly a cutting bit, and a method for making the same which has a hard metal alloy cutting edge of a material such as tungsten carbide, and at a much lower expense than is normally possible for cutting members provided with hard metal alloy cutting edges.

It is a further object of this invention to provide a cutting bit having a wear-resistant surface of hard metal alloy and method of making the same in which the bit can be easily and rapidly produced and can therefore be sold at a lower price than bits having hard metal alloy wear-resistant surfaces formed in accordance with the prior art.

In achievement of these objectives, this invention provides a cutting bit in which the outer tip or cutting edge of the bit is developed from a deposited layer or layers of a hard metal alloy, such as tungsten carbide, the tip or cutting edge being formed from fused particles or granules of a hard metal and a suitable matrix metal under the influence of heat, such as the heat provided by an oxy-acetylene torch.

Further objects and advantages of the invention will become apparent from the following description taken in connection with the accompanying drawings in which:

Fig. 1 is a side elevation view showing the manner of applying a tip of hard metal alloy, such as tungsten carbide, to a cutting bit of the type used in the coal mining industry;

Fig. 2 is a top plan view of the elements shown in Fig. 1, but with the hard metal alloy tip substantially completely formed;

Fig. 3 is an enlarged fragmentary view in vertical section of the cutting bit of Figs. 1 and 2 to illustrate the details of the cutting tip applied in accordance with the method of the invention;

Fig. 4 is a fragmentary top plan view of the bit of Fig. 3;

Fig. 5 is a side elevation view of a modified form of coal cutting bit having a tip of hard metal alloy applied in accordance with the invention;

Fig. 6 is a top plan view illustrating the method of applying a hard metal cutting edge to a jack hammer bit in accordance with the method of the invention;

Fig. 7 is a front elevation view of the elements shown in Fig. 6; and

Fig. 8 is an enlarged fragmentary view in horizontal section illustrating the details of the cutting edge applied to the jack hammer bit of Figs. 6 and 7 in accordance with the method of the invention.

Referring now to the drawings, and more particularly to Figs. 1-4, there is shown a cutting bit generally indicated at 10 of the type commonly used on coal cutting machines in the coal mining industry. Bits of this type are normally provided with oppositely disposed cutting tips such as the tips 12 indicated in dotted outline in Fig. 1.

In practicing the method of this invention, I use a conventional bit of the type indicated at 10 but cut or grind off the tip portions 12 in any suitable manner to leave a flat end surface 14. Alternatively, the bit may be provided with the flat end surfaces 14 during its initial manufacture. A new tip generally indicated at 16 in Fig. 2 is then built up on the flat end surface 14 in the manner which will now be described:

The cutting bit 10 which is to be tipped is placed on a horizontal work surface, with the flat end surface 14 which is to be tipped preferably extending a short distance beyond the front edge of the table or other work surface and toward the operator who is to apply the new tip 16. A tube or rod 18 filled with granules or crystals of a hard alloy material, such as tungsten carbide, is held in a straight vertical position in spaced relation to the outer flat end surface 14 of bit 10. Rod 18 is a hollow tube or sheath formed of a suitable material such as copper-plated steel, which serves as a container for the tungsten carbide granules or crystals and, at the same time, serves as a matrix which bonds the tungsten carbide crystals during the tipping operation to the cutting bit 10. An oxy-acetylene torch 20 is held directly in front of the upper end of rod 18 and the flame from the torch is adjusted in such manner that the flame envelops the upper end of rod 18 and also the outer end surface 14 of the bit 10 which is being tipped.

The oxy-acetylene blow torch which is used is of the conventional type and is connected to supply tanks containing oxygen and acetylene. Two separate pressure controls independently controlling the pressures of the oxygen and acetylene are provided adjacent the supply tanks while flow control valves which permit independent regulation of the rate of flow of the respective gases are located adjacent the outlet end of the torch. I have found in practice that a pressure of approximately 20 pounds per square inch for the oxygen and approximately 15 pounds per square inch for the acetylene provides a satisfactory performance in the application of hard metal alloy tips such as tungsten carbide tips by the method of this invention. The rate of flow of the acetylene is adjusted to be somewhat greater than that of the oxygen since excessive oxygen would oxidize the carbon in the steel and might result in blow holes or pin holes in the steel adjacent the tip of the cutting bit.

The application of the hot flame of the oxy-acetylene torch causes the portion of bit 10 adjacent end surface 14 to become extremely hot and almost molten. The upper end of rod 18 becomes molten, and the crystals of tungsten carbide together with the molten material of the sheath or rod 18, such as copper-plated steel, are blown by the pressure of the oxy-acetylene flame onto the flat surface 14. Thus, a bead 22 of tungsten carbide crystals with a matrix or binder of the softer material of which rod 18 is formed, is deposited on end surface 14. After depositing the initial bead 22, the operator momentarily moves the blowtorch laterally so the flame of the torch is out of contact with rod 18 and also out of contact with the outer end of the bit 10 in order to allow the bead 22 to cool. The operator then returns the blowtorch laterally so that the flame is again in contact with rod 18 and with the outer end of drill bit 10. This causes a second bead to be deposited on the outer surface of the first bead 22. After depositing the second bead, the operator again moves the blowtorch out of the path of rod 18 and permits the second bead to cool. In a similar manner, a plurality of beads are deposited as shown in Fig. 2, the successive beads becoming progressively narrower in width. Thus, for example, four or five beads may be deposited during the tipping operation to develop a tip of the type shown in Fig. 2. After forming the plurality of beads as shown in Fig. 2, the operator then applies the oxy-acetylene flame around the outer surface of the tip formed by the beads in order to smooth the bulging effect of the beads and produce a substantially smooth tip. The resulting tip after the smoothing operation has been performed is shown in Figs. 3 and 4. However, it is important to note that the tip has substantially the final shape desired by the time the last bead is applied, according to the teaching of the present invention. In other words, subsequent heating for smoothing can be eliminated and yet the end of the tip will still be substantially a needle sharp point.

There is generally indicated at 30 in Fig. 5 a conventional pick point bit of a type used on coal-cutting machines. Bit 30 has a shank portion 32 and a tapered cutting point 34. The outer end of cutting point 34 is provided with a tip 36 of hard metal alloy, such as tungsten carbide, which is applied in the same manner as previously described in connection with the embodiment of Figs. 1–4. That is, the outer end of the cutting point 34 is ground to provide a flat surface on which the hard metal alloy may be deposited. A plurality of beads of the hard metal alloy, such as tungsten carbide, are then deposited in the manner previously described to form a tip 36.

Referring now to Figs. 6–8, inclusive, there is shown the method of applying cutting edges of hard metal alloy, such as tungsten carbide, to a jack hammer bit of the type frequently used in road construction. The jack hammer bit is generally indicated at 40 and comprises a generally hollow cylindrical internally threaded shank portion 42 having integral therewith and at the outer end thereof four symmetrically spaced cutter elements 44. Each of the cutter elements 44 is formed of a pair of flat-face portions 46 and 48 which taper toward each other in an axially outward direction to define a cutting edge. The outer peripheral edge surface or gauge surface of each of the cutter elements 44 is indicated at 50 and tapers radially inwardly toward the longitudinal axis of the bit.

In applying the hard metal alloy or tungsten carbide to the jack hammer bit, the cutting edge defined by the junction of the flat tapered faces 46 and 48 of each cutting member 44 is first ground to provide a flat radially extending surface 52 as best seen in the front elevation view of Fig. 7. Flat surface 52 provides a base upon which a tip of the hard metal alloy may be applied. The outer peripheral gauge surface 50 is also ground down approximately one-sixteenth of an inch for the application of a layer of the hard alloy metal.

After the surfaces 50 and 52 of all of the cutter elements 44 have been ground in the manner just described, the jack hammer bit 40 is then ready for the application of the hard metal alloy. To facilitate the application of the hard metal alloy, the hollow threaded interior of the shank portion of bit 40 is placed in threaded engagement with the end of a swivelly mounted shaft 54, which may be rotated and also angularly adjusted about the swivel joint 55.

A tip of the hard metal alloy, such as tungsten carbide, is successively applied to each of the flat surfaces 52. The tip is applied to a cutter element 44 which is in a vertical position, such as the upper or lower cutter element 44. After completion of the application of the hard metal alloy to one of the cutter elements 44, the shaft 54 upon which the bit 40 is mounted is rotated through 90 degrees to bring another one of the cutter elements 44 into proper position for the application of the hard metal alloy tip. In applying the tip on the surface 52 of one of the cutter elements, a rod 18 filled with granules or crystals of tungsten carbide or other hard metal alloy is held by the operator in one hand in slightly spaced relation to the surface 52 and at an angle of about 45 degrees with respect to the longitudinal axis of the bit 40. The operator holds the oxy-acetylene torch 20 in his other hand and preferably at an angle of substantially 45 degrees with respect to the longitudinal axis of bit but on the opposite side of the axis as compared to the position of the rod 18. Consequently, the torch 20 and the rod 18 are positioned substantially perpendicularly to each other. The flame from torch 20 envelops both the outer tip of rod 18 and also the flat surface 52 on which the hard metal alloy is being deposited. The upper end of rod 18 becomes molten, and the crystals of tungsten carbide together with the molten material of the sheet or rod 18, such as copper-plated steel, are blown by the pressure of the oxy-acetylene flame onto the heated surface 52. Instead of depositing a plurality of beads as in the case of the embodiments of Figs. 1–5, the tungsten carbide is preferably deposited along surface 52 in a single pass, the operator moving the rod 18 and the torch 20 from the upper to the lower end of the surface 52. After a bead 53 of the hard metal alloy has been deposited along the entire radially extending length of the surface 52, the flame of torch 20 is then directed along each of the side edges of the bead in order to smooth the bead and help to develop the pointed edge or tip shown in Fig. 8, the pointed edge or tip already being substantially developed by the initial pass of rod 18 and torch 20 due to the orientation of the rod and torch to each other as shown in Fig. 6.

After the surfaces 52 of all four cutter elements 44 have had a tip of hard metal alloy applied in the manner just described, the gauge surfaces 50 of the respective cutter elements are then tipped with the hard metal alloy. In tipping the gauge surface, the jack hammer bit 40 is rotated so that the cutter element 44 whose gauge surface is to be tipped is disposed at the upper or 12 o'clock position. The bit is tilted in a forward direction by means of the swivel coupling 55 to facilitate the tipping operation. The rod 18 is held in a plane substantially parallel to the surface which is to be tipped. The oxy-acetylene torch 20 is held in a position which causes the flame from the torch to encompass both the end of rod 18 and also the gauge surface to which the hard metal alloy is being applied. The deposit of the hard metal alloy is controlled so as to be somewhat thicker at the axially outer end or tip of the gauge surface than at the wider inner portion of the gauge surface. The thickness of the deposited metal at the outer or tip edge of the gauge surface is approximately one-eighth of an inch.

It can be seen from the foregoing that there is provided in accordance with this invention a cutting tool such as a cutting bit having deposited thereon a cutting edge of hard alloy metal, such as tungsten carbide, which can be manufactured at a much lower cost than is possible with the previously known methods of producing cutting edges of hard metal alloy. Cutting bits having tips of hard metal alloy applied in accordance with the method hereinbefore described can be manufactured and sold for a small fraction of the cost of cutting bits having hard metal alloy inserts. The bits which are to have the hard metal alloy applied do not require extensive machining operations, as is usually required in the case of hard metal alloy inserts.

While there have been shown and described particular embodiments of the invention, it will be obvious to those skilled in the art that various changes and modifications may be made therein without departing from the invention and, therefore, it is aimed to cover all such changes and modifications as fall within the true spirit and scope of the invention.

What I claim as my invention is:

1. The method of providing a hard cutting tip on a tool which comprises the steps of providing a flat surface at the cutting end of said tool, depositing a first bead of hard metal alloy on said flat surface, allowing said bead to cool, and then depositing beads of progressively smaller width extending outwardly from said first bead in successively superposed relation to thereby form a tip on said tool.

2. The method of forming a hard cutting tip on a cutting member which comprises the steps of providing said member with a flat surface for receiving a hard metal alloy, depositing onto said flat end surface a first bead of hard metal alloy, and then depositing beads of progressively smaller width extending outwardly from said first bead in successively superposed relation to thereby form a tip on said tool, afterward applying heat along the outer surfaces of said superposed beads to smooth said beads into a continuous substantially smooth surface.

3. The method of forming a cutting edge on a tool member such as a cutting bit which comprises the steps of providing said tool member with a flat outer surface for receiving a hard metal alloy in a matrix of molten metal, supporting a rod of hard metal alloy in a sheath of softer metal adjacent said flat surface, heating said flat surface and said rod of hard metal alloy to soften said flat surface and melt said sheath and to cause a flow of said hard metal alloy and said molten sheath toward said flat surface, depositing a plurality of hard metal alloy beads in successively superposed relation to each other on said flat surface, and forming each successive bead of smaller width than the preceding bead to thereby form a tip on said surface.

4. A cutting tool comprising a body member having a tapered cutting end terminating in a substantially flat surface, and a cutting tip on said cutting end consisting of a plurality of superposed beads of hard metal alloy retained in a matrix of relatively soft metal, one of said beads of hard metal alloy being bonded to said flat surface by said matrix, and each succeeding bead being narrower in width than its preceding bead in a direction progressing outwardly from said body member whereby said cutting tip is also tapered.

References Cited in the file of this patent
UNITED STATES PATENTS

| | | |
|---|---|---|
| 1,327,098 | Kellogg et al. | Jan. 6, 1920 |
| 1,424,536 | Wenger | Aug. 1, 1922 |
| 1,464,076 | Jones | Aug. 7, 1923 |
| 1,547,842 | Stoody et al. | July 28, 1925 |
| 1,733,241 | Scott | Oct. 29, 1929 |
| 1,746,423 | Hartman | Feb. 11, 1930 |
| 1,784,015 | Lane et al. | Dec. 9, 1930 |
| 1,803,875 | Stoody et al. | May 5, 1931 |
| 1,841,268 | McKinlay | Jan. 12, 1932 |
| 1,960,879 | Russell et al. | May 29, 1934 |
| 2,306,683 | Zublin | Dec. 29, 1942 |
| 2,660,405 | Scott et al. | Nov. 24, 1953 |